Dec. 9, 1952          L. DE PAOLI          2,620,848

PIPE BENDER

Filed Aug. 8, 1949          2 SHEETS—SHEET 1

Louis DePaoli
INVENTOR.

Dec. 9, 1952     L. DE PAOLI     2,620,848
PIPE BENDER
Filed Aug. 8, 1949     2 SHEETS—SHEET 2
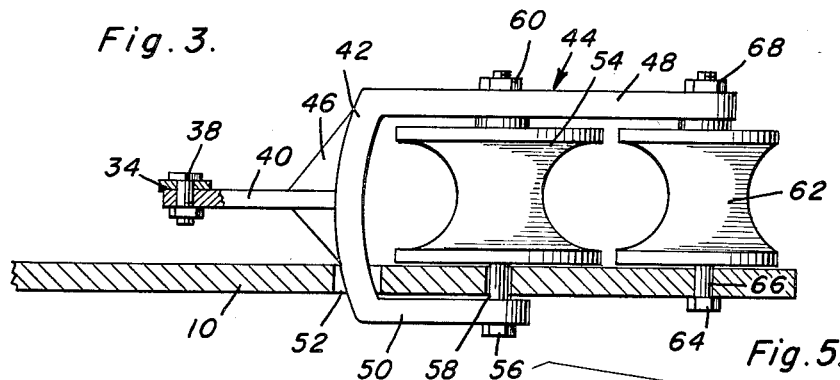
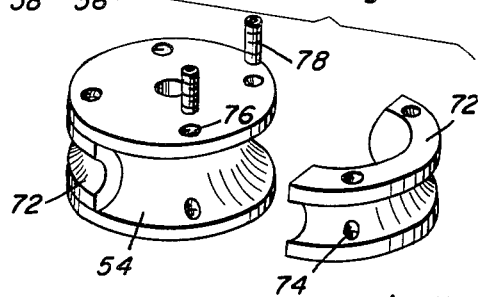
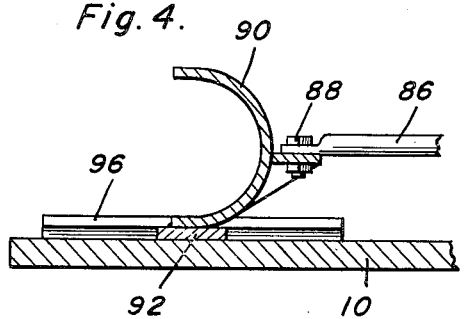
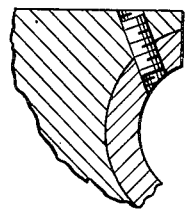
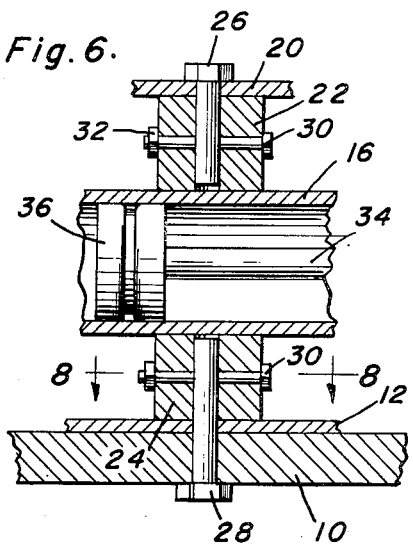
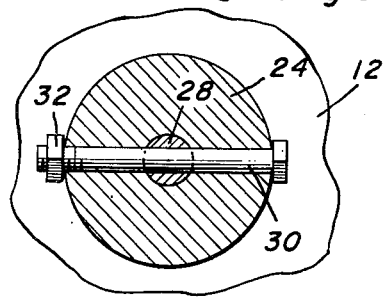
Louis DePaoli
INVENTOR.

Patented Dec. 9, 1952

2,620,848

UNITED STATES PATENT OFFICE 2,620,848

PIPE BENDER

Louis De Paoli, Neffs, Ohio

Application August 8, 1949, Serial No. 109,101

3 Claims. (Cl. 153—46)

This invention relates to a pipe bending machine designed primarily to be operated by hydraulic means.

The primary object of the invention is to provide a pipe bending machine which will effect a rapid and efficient bending of the pipe within a relatively short radius and at the same time maintain the original contour or roundness of the pipe.

Another object of the invention is to provide a machine of the character described which will effect a bend in the pipe without in any way weakening the walls thereof.

Yet another object of the invention is to provide a pipe bending machine which may be adjusted to accommodate pipes of different thicknesses, which is nevertheless relatively simple in design and construction, and easy to operate.

These, together with various ancillary objects and features of the invention which will later become apparent as the following description proceeds, are attained by the device, a preferred embodiment of which has been illustrated by way of example only in the accompanying drawings, wherein:

Figure 3 is a sectional view taken on the line 3—3 of Figure 1, some parts being shown in elevation;

Figure 4 is a sectional view taken on the line 4—4 of Figure 1;

Figure 5 is a group perspective view of a bending roller;

Figure 6 is a sectional view taken on the line 6—6 of Figure 1;

Figure 7 is a fragmentary sectional view illustrating the manner of attaching a reducer to the bending roller shown in Figure 5; and, Figure 8 is a sectional view taken on the line 8—8 of Figure 6.

Specific reference is now made to the drawings. In the several views in the accompanying drawings and in the following specification reference characters indicate corresponding elements throughout.

Figure 1:
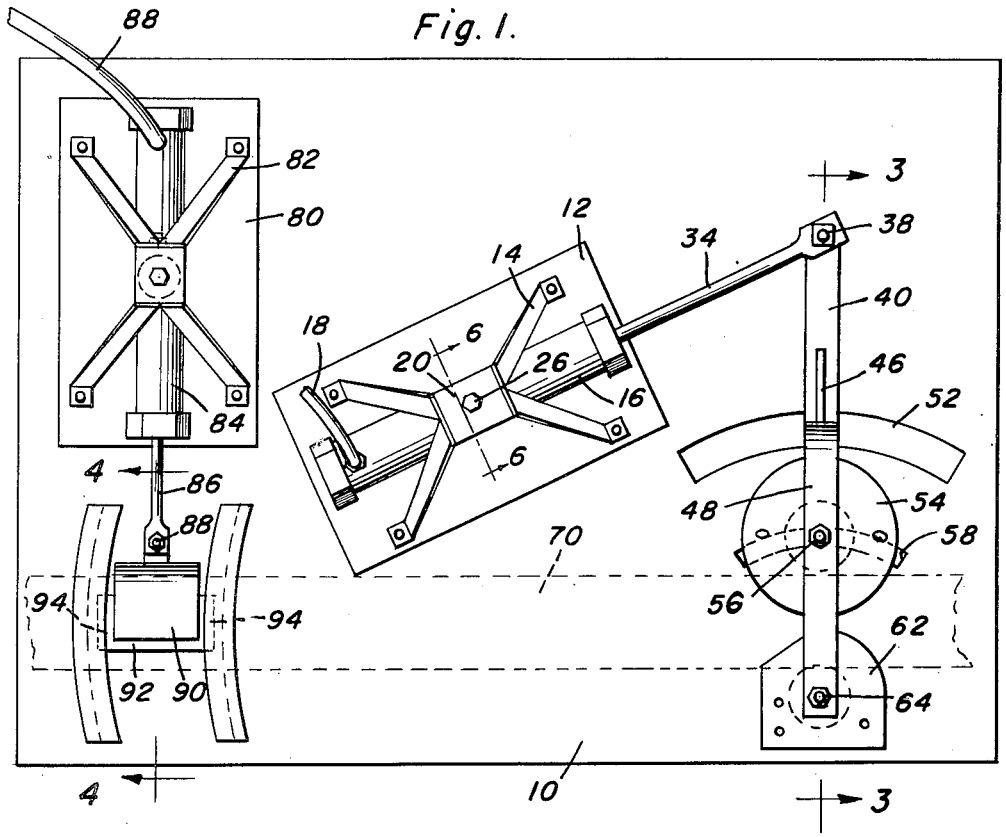
Figure 1 is a top plan view of the machine.
Figure 2:
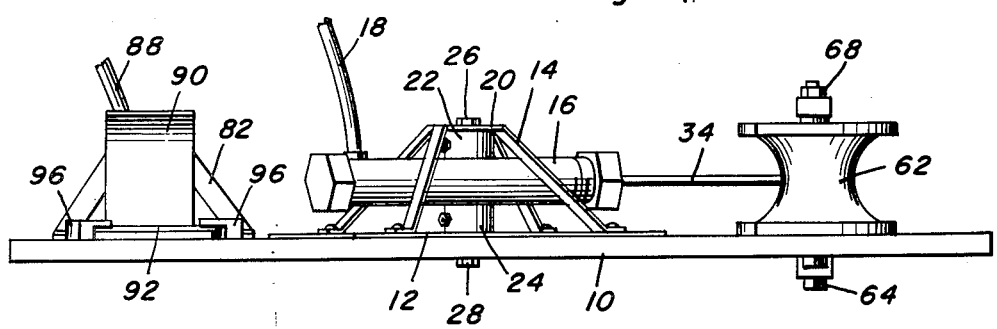
Figure 2 is a side elevational view thereof.

Indicated generally at 10 is a bed plate which is preferably rectangular and fabricated of metal. Substantially in the center of the plate and disposed at an angle to the front edge thereof is a further plate 12 to which is secured, preferably by rivets upstanding converging legs 14 forming a cage for supporting a hydraulic cylinder 16 having a fluid inlet pipe 18 leading to a source of fluid under pressure (not shown). The cylinder is maintained in a predetermined position in the cage by means of a plate 20 welded to the upper ends of the legs 14. Welded to the cylinder are diametrically opposed spaced blocks 22 and 24 (see Figure 6). A head bolt 26 extends loosely through the plate 20 and block 22 while a similar bolt 28 extends loosely through the bed plate 10, the plate 12 and the block 24. Extending through each of the blocks and through a transverse bore in each bolt is a headed bolt 30 which retains a nut 32 on its threaded end. Thus it will be seen that the cylinder 16, blocks 22 and 24 and bolts 26 and 28 are rotatable relative to the plates 10 and 20.

Movable in the cylinder is a piston rod 34 having a piston 36 thereon, the rod and piston being movable in response to a flow of fluid through the line 18 which may be controlled by a valve (not shown). At its free end as at 38, the rod is pivoted to a bar 40 which is in turn secured to the web portion 42 of a yoke 44, brace means 46 being provided to make a secure connection.

The yoke includes a longer leg 48 and a shorter leg 50, the web portion extending for sliding movement through an arcuate guide slot 52 in the bed plate. Received between the legs of the yoke is a sheave or reducer roller 54 which is rotatable on a headed bolt 56 which extends for sliding movement through a guide slot 58 in the bed plate, which slot is arcuated in the same manner as the slot 52 and is vertically spaced therefrom. The bolt extends through the leg 48 and receives a nut 60 for retaining the same on the yoke.

Carried between the legs of the yoke and spaced from the roller 54 is a second roller 62 which is rotatable on a headed bolt 64 which extends through an aperture 66 in the bed plate and through an aligned aperture in the leg 48, the free end of the bolt receiving a nut 68. It will be seen, therefore, that the yoke and reducer roller 54 can pivot in an arc on the bed plate about the bolt 64.

Inasmuch as one portion of a pipe 70 is received between the reducer roller 54 and the roller 62, a means is provided for accommodating pipes of varying diameter. This means consists of a pair of semi-circular channel members 72, see Figure 5, which fit around the reducer roller 54 and are removably retained thereon by threaded apertures 74 in the channel members which align with threaded apertures 76 in the roller 54 and which received threaded bolts or screws 78.

Secured to bed plate adjacent the cylinder 16 but extending perpendicular to the front edge of the bed plate is another plate 80 to which is secured upwardly converging legs 82 which form a cage and support another hydraulic cylinder 84 in the same manner as the cylinder 16 is supported on the legs 14 and plate 12. Slidable in the cylinder 84 is a piston rod 86 to which is secured a piston (not shown), the cylinder having a fluid inlet line 88 for connection to a source of fluid under pressure (not shown).

At its free end the rod 86 is pivoted by means of a pivot pin 88 to a pressure shoe 90 in the form of an arcuate band to the bottom edge of which is welded a laterally extending plate 92, the ends 94 of which are slidably received in laterally spaced arcuate L-shaped guide bars 96 welded or otherwise secured to the bed plate.

In practical operation, the pipe 70 is positioned between the rollers 54 and 62 and retained in the pressure shoe 90, the pipe extending substantially parallel to the front edge of the bed plate as shown in dotted lines in Figure 1. Fluid pressure applied to cylinder 84 will move the rod 86 and pressure shoe 90 against the pipe to exert a pressure thereon perpendicular to the longitudinal axis of the pipe. Fluid pressure applied to cylinder 16 will move rod 34 outwardly and swing yoke 44 and reducer roller 54 in an arc about the pivot 64, the arcuate slots 52 and 58 serving as guides. In this manner a round bend will be produced in the pipe which will always maintain the same diameter of the pipe and will not weaken the walls thereof.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A pipe bending machine comprising a bed plate, hydraulic means carried by said plate for applying pressure to one part of a pipe, and further means carried by said plate for bending the pipe, said further means including an hydraulic cylinder pivoted intermediate its ends on said bed plate, a piston rod slidable in said cylinder, a yoke, spaced upper and lower rollers for receiving a pipe therebetween and rotatably carried by said yoke, said yoke being pivoted at its bottom end to said bed plate on a pivot common with said lower roller, a link pivoted at its upper end to said piston rod and secured at its lower end to said yoke, and guide means for retaining said yoke and upper roller on said bed plate, said guide means including upper and lower arcuate slots in said bed plate, the upper portion of said yoke extending through said upper slot, the upper roller including a shaft secured at its ends to said yoke and extending through said lower slot.

2. A pipe bending apparatus comprising a bed plate having first and second concentric arcuate slots therein, a yoke including a short leg portion, a long leg portion and a web portion joining said leg portions, said web portion being slidably received in said first slot, said short leg portion underlying said plate and extending across said second slot, a pivot extending through said long leg portion and said plate, a first roller rotatably supported on said pivot and positioned between said long leg and said plate, a rod carried by said leg portions paralleling said pivot and being slidably received in said second slot, a second roller on said rod overlying the plate, means supported on the plate and operatively connected to the web portion of said yoke for pivoting the yoke about the pivot, and holding means carried by the plate for holding a pipe received between said rollers.

3. The combination of claim 2 wherein said means for pivoting the yoke comprises a hydraulic cylinder, a plate member underlying the cylinder and overlying the plate, a plurality of arms secured to said plate member, a second plate fixed to said arms and paralleling said plate member, a pair of blocks fixed to diametrically opposite sides of said cylinder, a first pivot pin extending through the second plate and into one block, and a second pivot pin extending through the plate member and into the other block, said pivot pins being coaxial.

LOUIS DE PAOLI.

REFERENCES CITED

The following references are of record in the file of this patent:

UNITED STATES PATENTS

| Number | Name | Date |
|---|---|---|
| 653,704 | Scott | July 17, 1900 |
| 1,136,252 | Meier | Apr. 20, 1915 |
| 1,239,165 | Davis et al. | Sept. 4, 1917 |
| 1,319,987 | Beers | Oct. 28, 1919 |
| 1,353,168 | McArthur | Sept. 21, 1920 |
| 1,606,096 | Oddie | Nov. 9, 1926 |
| 1,816,218 | Henry | July 28, 1931 |
| 1,911,028 | Maxwell | May 23, 1933 |
| 2,357,027 | Seifried | Aug. 29, 1944 |
| 2,485,096 | Hoff | Oct. 18, 1949 |

FOREIGN PATENTS

| Number | Country | Date |
|---|---|---|
| 793,989 | France | Dec. 2, 1935 |